United States Patent Office 3,657,168
Patented Apr. 18, 1972

3,657,168

NONBUBBLING ADHESIVE COMPRISING AN AQUEOUS DISPERSION OF POLYVINYL-ACETATE-THERMOSETTING CROSS-LINKING RESIN AND A CRITICAL AMOUNT OF HYDROXYPROPYL CELLULOSE

Peter Spiros Columbus, Whitestone, N.Y., and Carl Reinhold Erikson, Worthington, Ohio, assignors to Borden, Inc., Columbus, Ohio

No Drawing. Continuation-in-part of application Ser. No. 698,705, Jan. 18, 1968. This application Nov. 23, 1970, Ser. No. 92,207

Int. Cl. C08b *21/32*

U.S. Cl. 260—14 3 Claims

ABSTRACT OF THE DISCLOSURE

The instant invention relates to nonbubbling, heat curable water-based polyvinyl acetate thermosetting resin adhesives comprising, in addition to the resin noted, water-soluble hydroxypropyl cellulose in an amount sufficient to form a nonelastic continuous film on the adhesive surface when exposed to curing temperatures.

RELATED APPLICATIONS

This application is a continuation-in-part of U.S. application Ser. No. 698,705, now Pat. 3,542,706, filed Jan. 18, 1968, entitled, "Adhesives Comprising an Aqueous Dispersion of Polyvinyl Acetate Thermosetting Cross-linking Resin and a Critical Amount of Methyl Cellulose."

BACKGROUND OF THE INVENTION

At the present time adhesives are used in which the resinous components are polyvinyl acetate and thermosetting resins. While satisfactory for most uses, it has been found that when subjected to elevated temperature as at about 350° to 500° F., as in the preparation of oil filters when filter paper is adhered to other substrates, such adhesives bubble and splatter the filter paper making the adhesive unsuitable for this use. In addition, the adhesive channels along the fluted filtered paper stock of the filter sealing this porous area and negating its filtering function. This channeling and bubbling by decreasing the amount of adhesive at the bonding area leaves a weak and noncontinuous cured adhesive film between the paper stock and the metal, such as steel or tin, plate adhered to the paper in making the enclosed filter.

Attempts have been made in the past to overcome this bubbling by speeding up the curing rate of the resins in order to have an extremely rigid surface film at the earliest possible time to prevent bubbling. Such products do not work satisfactorily since the materials used to increase the curing rate give the product a relatively poor stability and short shelf life.

SUMMARY OF THE INVENTION

The present invention provides an adhesive composition which is substantially nonbubbling at the elevated temperatures noted and in which the thin continuous surface film first formed upon heating to cure is substantially nonelastic; the film cracks to permit escape of volatiles which would otherwise exert pressure underneath the film and cause bubbling with the ill effects set forth above.

Briefly stated, the present invention comprises an adhesive that is substantially nonbubbling when cured at elevated temperature (above 212° F.) comprising a polyvinyl acetate, a thermosetting resin cross-linkable with said polyvinyl acetate resin, and water-soluble hydroxypropyl cellulose in an amount sufficient to form a nonelastic continuous film on the adhesive surface when exposed to curing temperatures.

DETAILED DESCRIPTION

As to materials, the polyvinyl acetate used can be any homopolymer or copolymer latex or emulsion commonly used in making adhesives as more particularly described in Pats. Nos. 2,902,458 and 2,902,459; and for best results a combination of medium and high molecular weight acetate resins in the proportion of about 1 to about 2 parts by weight of medium molecular weight acetate for each part by weight of high molecular weight acetate. The terms "medium" and "high" molecular weight are meant to denote a range of molecular weight as understood in vinyl acetate polymerization art. Thus, medium molecular weight is from about 30,000 to about 80,000 and high anything over about 100,000.

The thermosetting resin used can be any curable compound cross-linkable with the polyvinyl acetate. Preferred are phenol-formaldehyde resoles. Also operative are urea-formaldehyde, phenol-formaldehyde novalaks, and the like phenolic-aldehyde and urea-aldehyde resins. Suitable examples are also set forth in Pat. No. 2,902,459.

It is to be pointed out that the polyvinyl acetate and thermosetting resins used and proportions thereof are those commonly used and well-known in the art, e.g., the weight ratio of polyvinyl acetate resin to thermosetting resin being in the range of 1:1 to 1:5 as disclosed in Pat. No. 2,902,459.

The water-soluble hydroxypropyl cellulose is the critical component of the composition. Attempts to use other water-soluble materials other than methyl cellulose disclosed and claimed in applicant's copending application, Ser. No. 698,705, now Pat. 3,542,706, have proven unsuccessful. Thus, carboxymethyl cellulose, hydroethyl cellulose, polyvinyl alcohol, polyvinyl pyrrolidone, polyethylene oxide, polyacrylates, polyvinyl methyl ether, and polyvinyl methy ether/maleic anhydride are not suitable.

The hydroxypropyl cellulose employed herein has a molecular weight of from 50,000 to 1,000,000 and preferably from 650,000 to 900,000. Further, most satisfactory results have been obtained using a ratio of hydroxypropyl groups per anhydro glucose unit which is not in excess of 4.6. Hydroxypropyl cellulose is prepared by reacting alkali cellulose with propylene oxide at elevated temperatures and pressures. The propylene oxide can be substituted on the cellulose through an ether linkage at the three reactive hydroxyls present on each anhydro glucase monomer unit of the cellulose chain. Published information suggests that the etherification takes place such that the hydroxy propyl substituent group contains a high predominance of secondary hydroxyl units. This material is available under the trademark, Klusel and is sold by the Hercules Chemical Company.

The cellulose component permits a gelling of the wet adhesive when subject to curing temperature thus resulting in a surface film on the adhesive which cracks to let the volatiles escape through fissures. There is no splattering of the adhesive over the fluted filter paper as is the case with the elastic film of the prior art adhesives when ruptured.

The proportion of hydroxypropyl cellulose used is important. In particular, the cellulose must be present in such proportion that the film first formed when the adhesive is exposed to elevated temperatures for curing will be nonelastic film; i.e., a proportion of 0.1–6 parts by weight of hydroxypropyl cellulose for 100 parts by weight of polyvinyl acetate solids and preferably 0.5–1 part by weight.

The invention will be further described in connection with the following examples which are set forth for the purpose of illustration only and wherein proportions are in parts by weight unless specifically stated to the contrary.

EXAMPLE 1

Two adhesives were prepared having the following formulations:

| | A | B |
|---|---|---|
| Polyvinyl acetate resin emulsion (55% solids)[1] | 38.8 | 38.8 |
| Polyvinyl acetate resin emulsion (55% solids)[2] | 29.1 | 29.1 |
| Hydroxypropyl cellulose (Grade H-Klusel) | | .3 |
| Phenol-formaldehyde resole (75% solids, P/F ratio of 1.13/2.24) | 19.4 | 19.4 |
| Aluminum silicate | 2.9 | 2.9 |
| Anti-foam[3] | .4 | .4 |
| Water | 9.4 | 9.1 |
| Total | 100.0 | 100.0 |

[1] Polyco 117SS.
[2] Polyco 188.
[3] Combination of Antifoam AF-66 silicone emulsion and Colloid No 581 (10% Al stearate in 3 parts polyoxyethylene and 1 part $C_{11-13}$ paraffin.

Both adhesives were separately tested by being placed in a 50 mm. aluminum weighing dish to a depth of 3/16 inch. A section of pleated filter paper was placed in the adhesive so that the paper was touching the bottom of the dish. The dish was then placed on a hot plate at 375° F. for 15 minutes until the adhesive cured. The dish was then removed from the hot plate and cooled to ambient temperature. The dish was examined for bubbling and channeling during heating and after cooling.

As to adhesive A, during heating numerous bubbles formed and broke splattering adhesive over the pleated filter paper. In addition, the filter paper was seen to absorb the adhesive splattering thereon. After curing and cooling it was noted that areas of the filter paper as high as 1 inch above the surface of the original adhesive level of 3/16 inch were covered with a coating of cured adhesive film. Also, many areas of the filter paper above 1 inch were covered with spots of cured adhesive caused by the splattering.

With adhesive B, no bubbling or splattering occurred during heating nor was any channeling noted. After curing and cooling the dish was examined and it was found that, at most, areas of the filter paper 1/16 inch above the surface of the original adhesive level of 3/16 inch were covered with a coating of cured adhesive film.

EXAMPLE 2

A series of adhesives of the following formulations were prepared:

| | A | B | C |
|---|---|---|---|
| Polyvinyl acetate resin Emulsion (Polyco 117SS) | 68.0 | 68.0 | 68.0 |
| Hydroxypropyl cellulose (Grade G-Klusel) | 1.0 | .15 | .4 |
| Phenol-formaldehyde resole (75% solids P/F ratio of 1.13) | 15.0 | 25.0 | 20.0 |
| Antifoam (same as Example 1) | .4 | .4 | .4 |
| Filler (aluminum silicate) | 5.0 | | 2.9 |
| Water | 10.6 | 6.45 | 8.3 |
| Total | 100.0 | 100.0 | 100.0 |

The adhesives were each tested as set forth in Example 1 and in each case no bubbling occurred.

EXAMPLE 3

A series of adhesives are made using the identical formulation set forth in Example 2 except that the polyvinyl acetate homopolymers and copolymers disclosed in Pats. Nos. 2,902,458 and 2,902,459 are each separately and in turn, substituted in equal proportions by weight for the polyvinyl acetate disclosed in adhesive A therein. In each instance a nonbubbling adhesive is obtained.

While the precise theory is not understood, it is believed that at the elevated temperatures (up to about 550° F.) used the thin layer of adhesive film first formed includes gel areas in the continuous film. These areas are nonelastic in nature while water is still present in the drying film and tend to break or fracture rather than expand thus allowing the volatiles such as water vapor and gas to escape. Although hydroxypropyl cellulose is thermoplastic in nature, these properties do not manifest themselves in the presence of water. Heretofore, the use of polyvinyl acetate-phenolic resins for the same purpose resulted in surface layers, which before they were fully cured, were still thermoplastic in nature and expanded like rubber. It was the rupturing of these rubbery expansions that caused the bubbling and splattering and channeling referred to above.

It will be understood that it is intended to cover all changes and modifications of the examples of the invention herein chosen for the purpose of illustration which do not constitute departures from the spirit and scope of the invention.

What is claimed is:

1. A water dispersable adhesive composition that is curable at elevated temperatures without boiling consisting essentially of an aqueous dispersion of polyvinyl acetate resin, a thermosetting resin cross-linkable with polyvinyl acetate resin selected from the group consisting of phenol-aldehyde condensation products and amino compound-aldehyde condensation products, and water soluble hydroxypropyl cellulose having a molecular weight of from 50,000 to 1,000,000 in the proportion of about 0.1 to about 6 parts by weight for 100 parts by weight of polyvinyl acetate solids, the weight ratio of polyvinyl-acetate resin to thermosetting resin being in the range of 1:1 to 1:5.

2. The adhesive of claim 1, wherein the thermosetting resin is a phenol-formaldehyde resole.

3. The cellulose of claim 2, wherein the ratio of hydroxypropyl groups per anhydro glucose unit is not in excess of 4.6.

References Cited

UNITED STATES PATENTS 3,542,706 11/1970 Columbus ............ 260—14

HAROLD D. ANDERSON, Primary Examiner

E. D. WOODBURY, Assistant Examiner

U.S. Cl. X.R.

117—161 C; 260—15